(12) United States Patent
Field et al.

(10) Patent No.: US 6,481,516 B1
(45) Date of Patent: *Nov. 19, 2002

(54) ELECTRIC HYBRID VEHICLE

(75) Inventors: Bruce F. Field, Golden Valley, MN (US); Spencer E. Adler, Washington, DC (US)

(73) Assignee: Field Hybrids, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/483,008

(22) Filed: Jan. 13, 2000

Related U.S. Application Data

(63) Continuation of application No. 08/705,001, filed on Aug. 29, 1996, now Pat. No. 6,044,922, which is a continuation of application No. 07/948,288, filed on Sep. 21, 1992, now abandoned, which is a continuation-in-part of application No. 07/880,967, filed on May 8, 1992, now abandoned.

(51) Int. Cl.$^7$ .................................................. B60K 6/02
(52) U.S. Cl. ...................... 180/65.2; 180/65.3; 180/65.4
(58) Field of Search .............................. 180/65.2, 65.3, 180/65.4, 65.8

(56) References Cited

U.S. PATENT DOCUMENTS

| 3,719,881 | A | 3/1973 | Shibata et al. ................ 320/62 |
| 3,874,472 | A | 4/1975 | Deane ....................... 180/65 R |
| 3,888,325 | A | 6/1975 | Reinbeck ................... 180/65 A |
| 3,904,883 | A | 9/1975 | Horwinski ................... 290/50 |
| 3,917,017 | A | 11/1975 | Deane ....................... 180/65 R |
| 4,042,056 | A | 8/1977 | Horwinski ................ 180/65 A |
| 4,180,138 | A | 12/1979 | Shea .......................... 180/65 A |
| 4,187,436 | A | 2/1980 | Etienne ........................ 290/27 |
| 4,305,254 | A | 12/1981 | Kawakatsu et al. ............ 60/716 |
| 4,306,156 | A | 12/1981 | Monaco et al. ................ 290/17 |
| 4,774,811 | A | 10/1988 | Kawamura ..................... 60/608 |
| 4,923,025 | A | 5/1990 | Ellers .......................... 180/65.2 |
| 5,081,365 | A | 1/1992 | Field et al. ..................... 290/45 |
| 5,212,431 | A | 5/1993 | Origuchi et al. ............. 318/139 |
| 5,327,987 | A | 7/1994 | Abdelmalek ................ 180/65.2 |
| 5,346,031 | A | 9/1994 | Gardner ........................ 180/179 |
| 5,492,189 | A | 2/1996 | Kriegler et al. ............. 180/65.2 |
| 5,495,906 | A | 3/1996 | Furutani ..................... 180/65.2 |
| 6,044,922 | A | * | 4/2000 | Field .......................... 180/65.2 |

FOREIGN PATENT DOCUMENTS

| DE | 2517110 | 4/1975 | ................. 180/316 |
| EP | 0136055 A1 | 8/1984 | |
| JP | 48-64626 | 9/1973 | |
| JP | 49-29642 | 8/1974 | |
| JP | 51-103220 | 8/1976 | |
| JP | 53-55105 | 5/1978 | |
| JP | 55-110328 | 8/1980 | |
| JP | 62-184926 | 8/1987 | |
| JP | 2-7702 | 1/1990 | |
| JP | 4-67703 | 3/1992 | |
| WO | PCT/SE81/00280 | 9/1980 | ........... B60L/11/12 |

* cited by examiner

Primary Examiner—Robert P. Olszewski
Assistant Examiner—James S. McClellan
(74) Attorney, Agent, or Firm—Westman, Champlin & Kelly

(57) ABSTRACT

A vehicle having an electric hybrid power system is provided. The vehicle includes an electric motor drivably connected to one or more ground engaging wheels. A battery pack stores electricity to power the electric motor. An engine is drivably connected to the wheels with an alternator connected to the engine for recharging an accessory battery. The alternator has at least a voltage output range of between approximately the standard output voltage of the accessory battery and the standard output voltage of the battery pack. In accordance with the present invention, a mechanism for electrically connecting the alternator to the battery pack is provided such that the alternator alternatively recharges both the battery pack and the accessory battery.

37 Claims, 3 Drawing Sheets

ELECTRIC HYBRID VEHICLE

This application is a continuation of application Ser. No. 08/705,001, filed on Aug. 29, 1996 now U.S. Pat. No. 6,044,922 entitled ELECTRIC HYBRID VEHICLE, status pending, which is a continuation of application Ser. No. 07/948,288 filed on Sep. 21, 1992, status abandoned, which is a continuation-in-part of application Ser. No. 07/880,967 filed on May 8, 1992, status abandoned.

BACKGROUND OF THE INVENTION

This invention relates to electric hybrid vehicles and, in particular, it relates to a combined series-parallel electric hybrid vehicle.

There are basically three types of electric propulsion systems known for vehicles. First, there is a pure electric drive vehicle. The pure electric drive vehicle has an electric motor which receives power from a main battery pack via a controller. The controller controls the speed of the electric motor. The major disadvantage of a pure electric drive vehicle is that the range is very limited and the vehicle must be stopped and connected to an energy source such as an electrical outlet in order to be recharged.

The second type of electric propulsion system for vehicles is a series hybrid system. There are three major components in a series system: (1) a generator; (2) an electric motor arranged in series; and (3) an engine powering the generator. Mechanical energy generated by the engine is converted to electrical energy by the generator and is then converted back to mechanical energy by the electric motor. Each process of conversion is afflicted with losses and subsequent reductions of efficiency which is a significant disadvantage of this type of system.

The main advantage of the series hybrid is that it is possible to operate the engine at a fixed operating point within its engine speed/torque map. This point can be selected so that the engine functions with the greatest efficiency or produces particularly low emissions. Nevertheless, the efficiency of the entire series hybrid drive system is less than satisfactory.

The third type of electric propulsion systems is the parallel hybrid system, as described, for example, in U.S. Pat. No. 5,081,365. Parallel hybrid propulsion systems generally have three component areas. (1) electrical storage mechanism, such as storage batteries, ultracapacitors, or a combination thereof; (2) an electric drive motor, typically powered by the electrical storage mechanism and used to propel the wheels at least some of the time; and (3) an engine, such as a liquid fueled engine (e.g. internal combustion, stirling engine, or turbine engine) typically used to propel the vehicle directly and/or to recharge the electrical storage mechanism.

In parallel hybrid systems, the electric drive motor is alternatively driven by mechanically coupling it to the engine. When coupled, the engine propels the vehicle directly and the electric motor acts as a generator to maintain a desired charge level in the batteries or the ultracapacitor. While a parallel hybrid system achieves good fuel economy and performance, it must operate in an on and off engine parallel mode. In this mode, the stop-and-go urban driving uses electric power and the engine is used to supplement existing electric system capacity. For long trips, when the battery for the electric motor could be depleted, the vehicle cruises on the small engine and the electric system will provide the peaking power.

The primary advantage of the parallel hybrid drive over the series drive previously described is improved efficiency (lower fuel consumption) in the engine, since the engine's mechanical energy is passed directly on to the drive axle. The bulky generator is no longer required, thereby lowering both the cost and weight of the vehicle.

However, with extended stop and go urban driving, the battery pack will be often depleted and will need a charge in addition to the charge received from the electric motor. Or, the engine will be required to power the vehicle during the stop and go driving period thereby eliminating most beneficial effects of such an electric system. Therefore, the vehicle with a parallel system has limited inner city driving capabilities and range.

SUMMARY OF THE INVENTION

Due to the innate, but separate, advantages of both the series and the parallel drives, a method of combining series and parallel systems has been invented. In the present invention, the engine has an alternator or generator connected directly to the engine's drive shaft by some mechanism, for example, a fan belt. Generally, alternators or generators are used to charge the battery of a vehicle's accessory systems, such as the light, fans, etc. These systems typically operate on twelve (12) volts. However, the inventors of the present invention realized that the alternator is very capable of high current/high voltage output, ranging from, but not limited to, approximately ten (10) volts to in excess of one hundred fifty (150) volts. In standard applications, such as vehicle accessory systems, voltage output is regulated to approximately fourteen (14) volts. Implementation of the present invention allows for efficient usage of the upper limits of the alternator's output capacity. Voltage output can be controlled by a central process controller, which directs excess current to the parallel system vehicle's main storage battery pack. Voltage output can be varied to the appropriate levels by regulating the field current, among other methods of control.

The current flow, for example to the twelve (12) volts accessory battery, or to the hybrid vehicle's main storage battery, can be controlled simply by solid state switching mechanism. An automatic, selectable voltage output of the alternator will also be controlled by automatic mechanism via the process controller.

An alternative method of control is to set the alternator to a continuous high voltage level, matching that of the hybrid's main battery pack. A switching power supply would then channel generated current into the main battery pack, or into the vehicle's twelve (12) volt battery. The switching power supply has the ability to reduce voltage to the appropriate level, based upon which electrical system is being fed.

This arrangement eliminates the main disadvantage of conventional parallel hybrid designs as used in a vehicle. It has been found that at slow speed, such as stop and go urban driving, the parallel system will allow the main storage battery pack to deplete its energy below a comfortable and usable level of charge. A series hybrid system is more adaptable to urban driving because it constantly funnels limited amounts of electrical energy back into the system's battery pack. The main negative of a series hybrid system is that it does not permit an adequate charging level to sustain the high energy demand associated with long term, high speed driving. The present invention prevents depletion of the battery pack by better utilizing the existing component structure typically associated with parallel hybrid systems.

Prior hybrid propulsion systems were typically capable of operating in one or more of the following modes (but none were capable of operating in a choice of all of them): (1) a series hybrid, which is plugged in for recharge, and which uses the engine as a "range extender" when the electrical storage mechanism are depleted, and/or (2) a series hybrid which runs the engine in order to recharge its own electrical storage mechanism, typically via a generator/alternator, and/ or (3) a parallel hybrid, which is plugged in for recharge, and which uses the engine and/or the electric motor either separately or in unison, depending upon conditions, circumstances, and the process controller, in order to directly power the vehicle, and/or (4) a parallel hybrid similar to the one described in (3), directly above, but which recharges its own electrical storage system via the engine and, typically, a generator/alternator (see U.S. Pat. No. 5,081,365). Each of these modes has its benefits and drawbacks, depending on circumstances, and the industry is involved in debate over which system is the most promising.

The purpose of the series-parallel functionality is to overcome problems inherent to either concept when employed individually. The advantages are increased range in the urban driving mode and a secondary method of range extension in highway mode without significantly increasing the bulk or cost of the base parallel system. In addition, the control of the operation of the drive motor is more versatile and efficient.

DETAILED DESCRIPTION OF THE PREFERRED EMBODIMENTS

Figure 1:
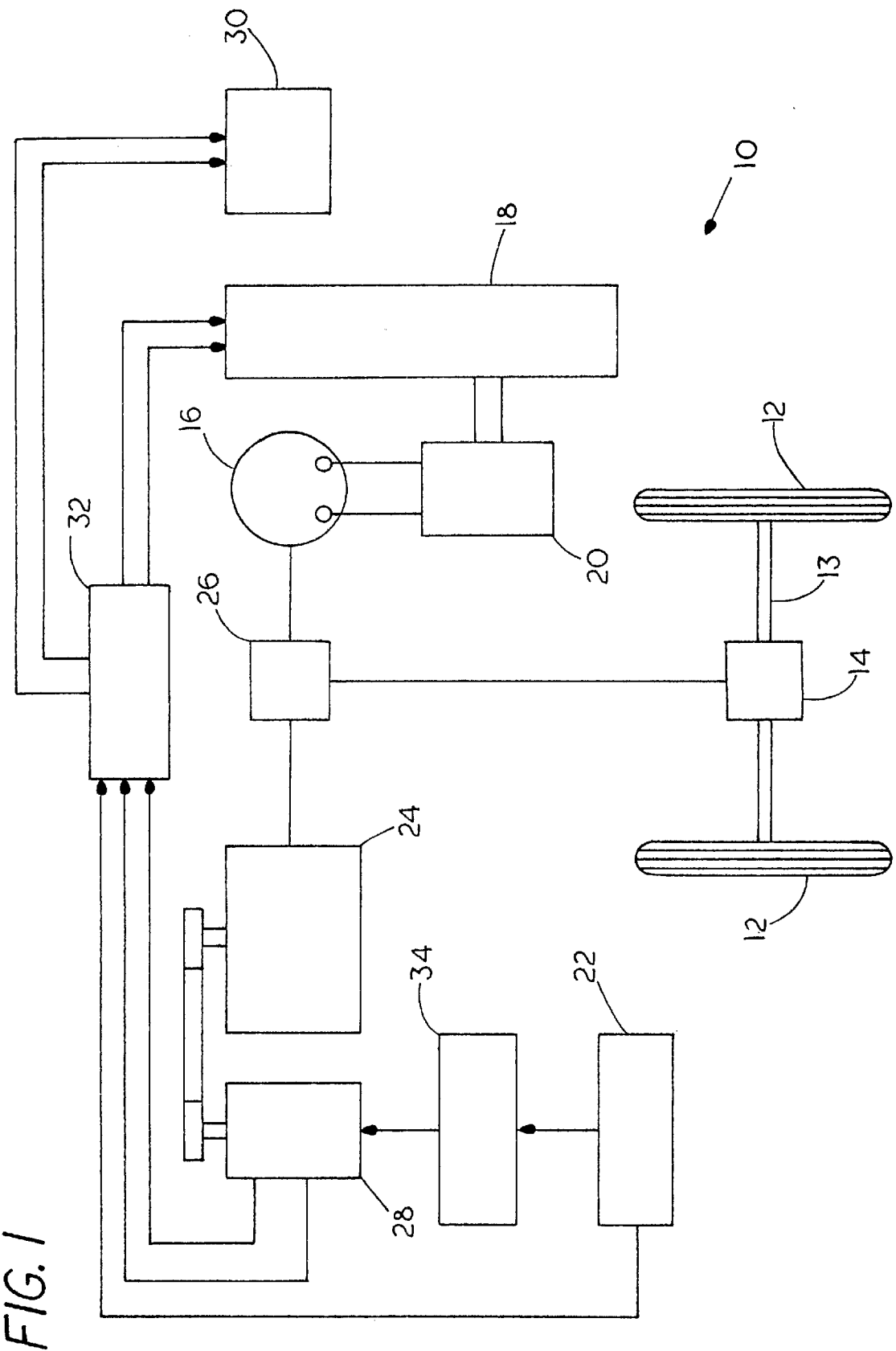
FIG. 1 is a block diagram of the power train and the controls for a vehicle incorporating the present invention.

FIG. 1 is an embodiment of the present invention. FIG. 1 illustrates in block diagram form an electric parallel hybrid vehicle power train and controls. An example of an electric hybrid vehicle power train is described, for example, in U.S. Pat. No. 5,081,365 which was patented by an inventor of the present invention and which patent is incorporated herein by reference.

The parallel hybrid system of the present invention 10 includes a battery pack 18, an electric drive motor 16 powered by the battery pack 18 and an engine 24. A process controller 22 determines the prime mover of the vehicle, i.e., whether the electric motor 16 powers the vehicle, or the engine 24 drives the vehicle, or both the electric motor 16 and the engine 24 drive the vehicle.

The electric hybrid power train and its related controls 10 includes a pair of ground engaging drive wheels 12. The wheels 12 could be either the rear wheels or the front wheels of the vehicle. In addition, it is within the scope of the present invention to have the drive wheels 12 be part of a four-wheel drive system or a three-wheel tricycle.

The drive wheels 12 are connected by a drive axle 13 to a differential 14, the housing of the differential 14 being attached to a housing of a transmission (not shown). The transmission is controlled in a conventional manner by a gear shift lever (not shown) and a foot-operated clutch shown in FIG. 3. The foot-operated clutch, gear shift lever, transmission, differential 14, drive wheels 12 and manner of connecting the drive wheels 12 to the differential 14 are conventional to a standard motor vehicle.

As mentioned above, the electric hybrid power train 10 includes an electric motor 16 which is one of two prime movers of the vehicle. The electric motor 16 is preferably a 40 HP 96-volt permanent magnet or compound wound DC motor. The 96-volt battery pack 18 consisting of eight (8) 12-volt batteries in series is connected to the electric motor 16. If desired, a conductor plug (not shown) may be connected to cross the battery pack 18 to connect the batteries in the battery pack 18 to an off-board battery charger. Such a mechanism for recharging the batteries may be desirable at times, though under most conditions, it will not be needed due to the on-board charging capability of the present system, as described below.

The 96-volt motor 16 and 96-volt battery pack 18 are not the only type that could be used. Indeed, a higher voltage motor and battery pack could give advantages in component weight and efficiency. It should be noted that the motor size and battery capacity are parameters that would in fact vary with the chosen vehicle weight and size.

A transistorized motor speed controller 20 is positioned between the electric motor 16 and the battery pack 18 and controls the current flow to the electric motor 16. The motor controller 20 is the link between the process controller 22 and the electric motor 16. The process controller 22, as described above, signals the motor controller 20 which disengages the current flowing from the battery pack 18 to the electric motor 16 or creates a generator from the electric motor 16 to charge the battery pack 18.

The motor controller 20 as used in the present invention can be a commercially available pulse width modulation type such as, for example, one made by Curtis PMC of Dublin, Calif. The motor controller 20 regulates an array of parallel power MOSFET transistors to vary the average current to the electric motor 16 in response to a signal from the process controller 22.

Figure 3:
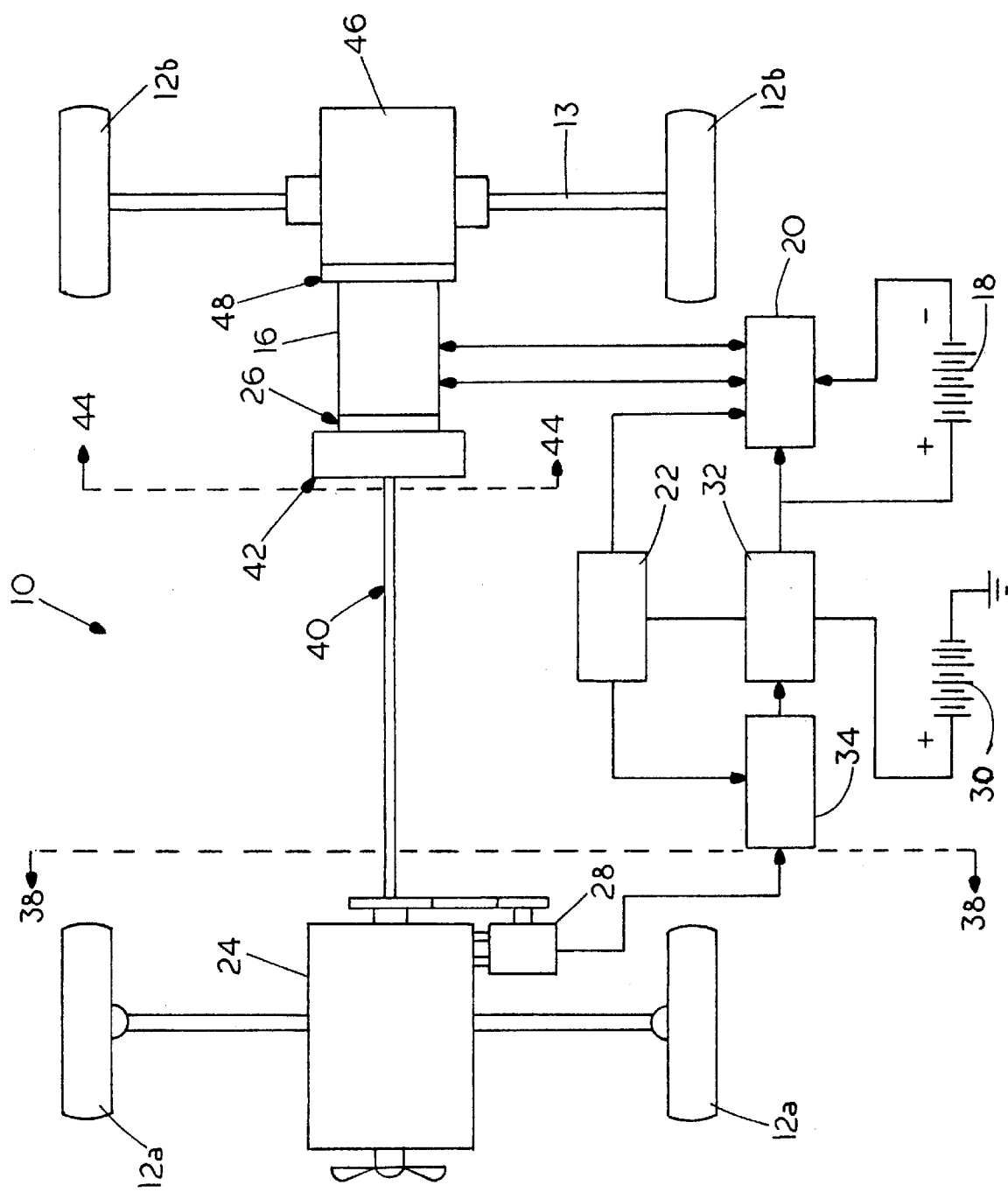
FIG. 3 shows the location of the electric and internal combustion motors in an embodiment of the present invention.

At 24, is illustrated an internal combustion engine, which is the second prime mover of the vehicle. The engine is located in the end of the vehicle opposite the electric motor 16 as shown in FIG. 3. The engine 24 is preferably a 16-hp diesel engine, but it could be a spark ignition engine, turbine, or any other practical prime mover. For convenience in this discussion, it will be referred to as a diesel engine.

During acceleration of the vehicle, it is preferred that only the electric motor 16 drives the wheels 12. An electric clutch 26 positioned between the electric motor 16 and the engine 24 will allow the engine 24 to assist in driving the wheels 12 if the process controller 22 determines that the electric motor 16 needs assistance. Basically, such a situation arises it the process controller 22 determines that the electric motor 16 is not capable of accelerating the vehicle, such as accelerating up a steep incline. If such is the case, the process controller 22 will cause the engine 24 to be brought on line, as described below, to assist in driving the vehicle. While the engine 24 will assist the electric motor 16 if needed, it is not desirable to use the engine 24 in this fashion since accelerating the vehicle with the engine 24 burns much fuel thereby decreasing fuel economy and increasing potential pollution.

After the vehicle has accelerated using the electric motor 16 and the electric motor 16 reaches a predetermined speed (rpm) without the assistance of the engine 24, the process controller 22 will cause the engine 24 to start or rev to get the engine 24 to approximately the same speed as the electric motor 16, i.e., within 1% of the electric motor's rpm. Once the engine 24 achieves the required approximately equal rpm, the electric clutch 26 activates such that the engine 24 also drives the wheels 12. While the electric motor 16 remains on line to drive the vehicle, the electric motor 16 is generally not needed in this capacity. Therefore, the process controller 22 switches the electric motor 16 into a generator. The process controller 22 controls the amount of current the electric motor 16 is capable of putting out and in that time puts energy back into the battery pack 18. For example, during an acceleration up to approximately 40 to 50 m.p.h. on the electric motor 16 only, it will take approximately 1 ½ to 2 minutes to put that energy back in the battery pack.

If at any time during the driving of the vehicle, after the acceleration period, the process controller 22 senses that extra power is needed to maintain a constant speed, such as accelerating to pass or climbing a steep incline, the process controller 22 will signal the motor controller 20 to activate the electric motor 16 to assist the engine 24. Basically, if the process controller 22 determines that the engine 24 needs additional power or rpm, the electric motor 16 is brought on line to assist in driving the wheels 12. In a standard vehicle, if the foot pedal is depressed to a certain point, the speed of the vehicle will be directly dependant on whether the vehicle is on a flat surface or an incline. With the vehicle of the present invention, if the foot pedal is depressed to a certain point, the speed of the vehicle will be at a certain predetermined speed, regardless of whether the vehicle is travelling on a flat surface or an incline. Therefore, if the engine 24 is not capable of maintaining the speed of the vehicle, the process controller 22 will activate the electric motor 16 to assist in driving the vehicle. Once that extra assistance is no longer needed, the process controller 22 will signal the motor controller 20 to cease the supply of electricity coming from battery pack 18 to the electric motor 16 and cause the electric motor 16 to operate as a generator to charge the battery pack 18.

Preferably, the electric clutch 26 is of any type which is capable of being engaged or released at will such as an AT clutch by Warner Electric, a subsidiary of DANA. When engaged, the electric clutch 26 couples the engine 24 to the input shaft of a transfer case (not shown), which is preferably a belt drive, but may be a gear or chain drive. Space permitting, the output shaft of the engine 24 could be aligned with the shaft of the electric motor 16 and the electric clutch 26 could selectively couple the engine 24 and the electric motor 16 directly without any need for a transfer case.

It will also be understood that requirements of available space in the vehicle might dictate some other configuration for selectively coupling the engine 24 to the electric motor 16. For example, a third shaft with a transfer case on each end of the shaft might be needed. It is within the scope of the present invention to cover any configuration required, so long as the engine 24 is coupled to the electric motor 16, through means which may be engaged to release at will. The electric clutch 26 is a preferred device for this purpose due to the ease of controlling it, but other mechanisms could be employed, such as a centrifugal clutch and pneumatic clutches.

The engine 24 is equipped with and drives an alternator 28, such as a Motorola 150A alternator DC power unit which is capable of high current/high voltage output, ranging from but not limited to, approximately 10 volts to an excess of 150 volts. In standard applications, such as vehicle accessory systems, voltage output is regulated to approximately 14-volts. The 14-volt output of the alternator 28 charges an accessory battery 30 which may be a single heavy duty 12-volt automotive battery. A group of accessories, which the accessory battery 30 controls and powers, includes such conventional automotive equipment as horn, lights, windshield wiper, etc. In addition, engine 24 also has a conventional starting motor (not shown) activated by a starter solenoid and powered by the accessory battery 30.

In accordance with the present invention, the alternator is additionally connected to the battery pack 18. In order to charge the battery pack 18, the voltage output of the alternator 28 must be compatible to charge the battery pack 18. Therefore, the process controller 22 includes a regulator control 34 which controls the voltage output of the alternator 28. The regulator control 34 adjusts the voltage of the alternator from a voltage compatible to charge the accessory battery 30 to a voltage compatible to charge the battery pack 18 and back to the voltage compatible to charge the accessory battery 30. Typically, the voltage compatible to charge the battery pack 18 is substantially greater than the voltage compatible to charge the accessory battery 30.

The regulator control 34 is actually part of the process controller 22 such that when the accessory battery 30 is completely charged, the process controller 22 will initiate the regulator control 34 to adjust the voltage upward and charge the battery pack 18. As mentioned, the battery pack 18 has a typically much higher voltage than that of the accessory battery 30. The voltage output of the alternator 28 is adjusted by the regulator control 34 to match the requirements of the accessory battery 30, which receives the highest priority in the voltage flow hierarchy as will be described below. Excess capacity, already at a compatible higher voltage level, is then made available to the battery pack 18 on a secondary priority level.

In the preferred embodiment, the actual switching of the voltage path from the alternator 28 to the accessory battery 30 and the battery pack 18 is accomplished through a switching mechanism 32. The switching mechanism 32 is positioned between the alternator 28 and the accessory battery 30 and the battery pack 18. The switching mechanism 32 receives signals from the process controller 22 directing the voltage output of the alternator 28 to either the accessory battery 30 or to the battery pack 18 depending on the signal from the process controller 22.

In the preferred embodiment, the alternator 28 will have a voltage output of approximately 14-volts when charging the accessory battery 30 and a voltage output of approximately 90-volts when charging the battery pack 18. Once the accessory battery 30 has been completely charged, the process controller 22 will increase the voltage output of the alternator 28 and will also signal the switching mechanism 32 to switch the path of the voltage from the accessory battery 30 to the battery pack 18. Thereafter, the voltage output of the alternator 28 will be directed to the battery pack 18 until the accessory battery 30 requires recharging. Thereupon, the process controller 22 will alter the voltage output of the alternator 28 to a suitable lower voltage and signal the switching mechanism 32 to begin directing the voltage to the accessory battery 30. This process will occur until once again, the accessory battery 30 is completely charged.

Figure 2:
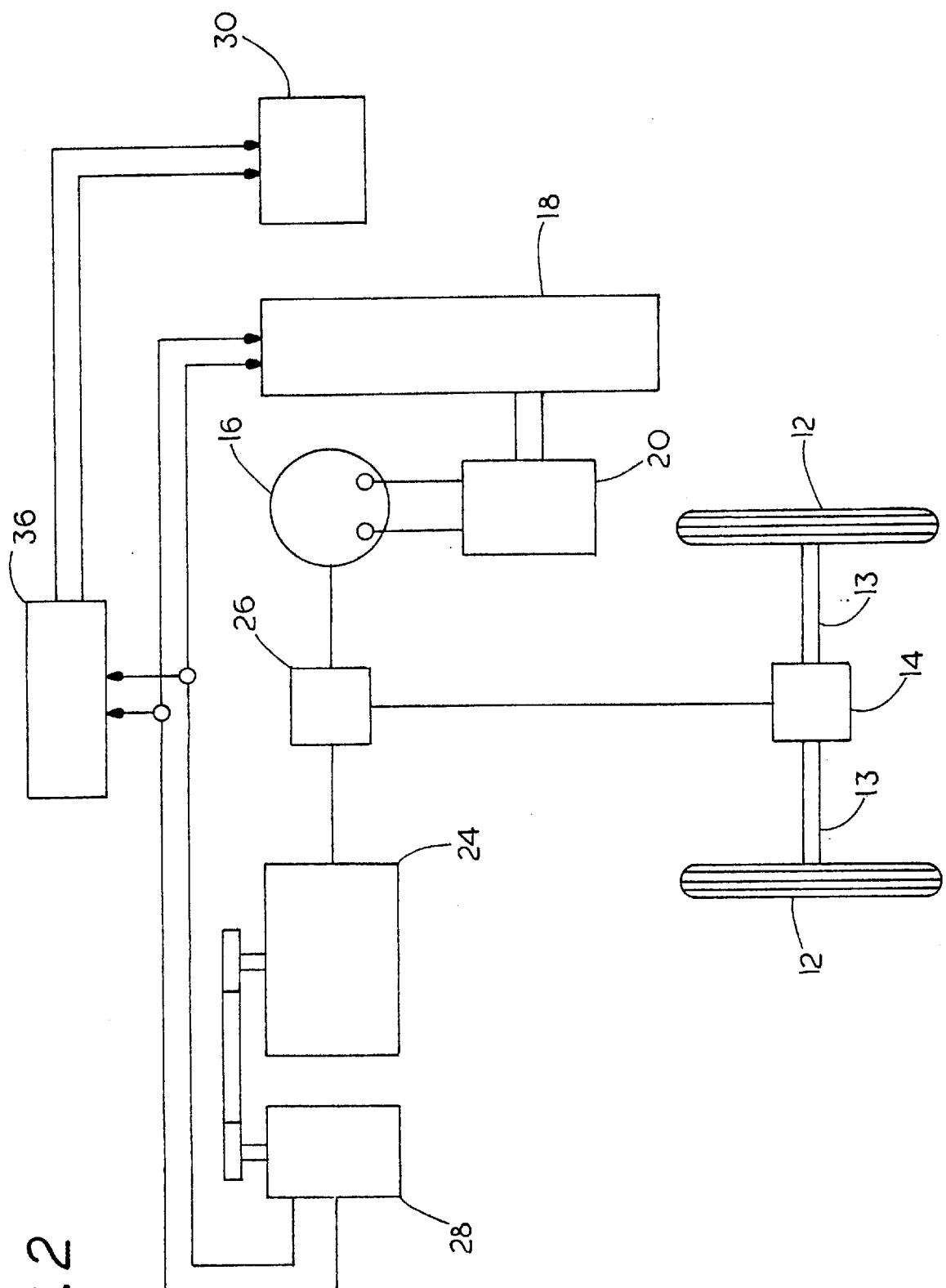
FIG. 2 is a block diagram of the power train and the controls for a vehicle incorporating an additional embodiment of the present invention.

Another embodiment of the present invention is referred to in FIG. 2. For ease of understanding, like elements will be referred to with like reference characters.

As best illustrated in FIG. 2, the voltage output from the alternator 28 would be directed directly into the battery pack 18. In this embodiment, the process controller 22 and the switching mechanism 32 are not required. The voltage output would be preset at an approximate constant amount. A power supply 36 connected to receive some of the output voltage of the alternator reduces that portion of the voltage output of the alternator 28 such that the accessory battery 30 would also receive a compatible voltage.

FIG. 3 illustrates the specific location of the electric motor 16 and the combustion engine 24 with respect to the vehicle. The internal combustion engine 24 is located at one end portion 38 of the vehicle. The engine 24 is joined to a small diameter composites drive shaft 40 such as the one described and sold by H and R Composites, Inc. as described above, which is incorporated herein by reference. The drive shaft 40 is connected to the electric motor 16 via the fly wheel 42 and the electric clutch 26. The electric motor 16 is located in the end portion 44 of the vehicle opposite the end portion 38. Note that the end,portion 44 may be the front portion of the vehicle where motors are located in standard vehicles or the end portion 44 may be the area where the trunk is located in standard vehicles. Additionally, the vehicle may be front wheel or rear wheel drive regardless of whether the electric motor 6 is in the front or rear end of the vehicle. Preferably, the electric motor 16 is located in the front of the vehicle when the vehicle has front wheel drive and in the rear of the vehicle when the vehicle has rear wheel drive. Thus, either of the wheels 12a or the wheels 12b may be the drive wheels. The electric motor 16 is connected to a transaxel 46 via a foot operated clutch 48. The transaxel 46 may be a four-speed transaxel.

The design shown in FIG. 3, provides several distinct advantages. The design has little mechanical complexity, provides spacing between the component parts, and allows easy access to the component parts. These features simplify manufacturing and maintenance work. The design also teaches a system that can be adapted to almost any car. The design provides good weight distribution in the vehicle. And the design uses a lightweight drive shaft, to help minimize the overall weight of the vehicle."

It can be seen that any series hybrid or parallel hybrid vehicle can be adapted to use the present invention. First, regardless of the hybrid type, a high voltage alternator can be placed (or may already exist) in the vehicle. The high voltage alternator is then connected to the battery pack of the electric motor. A voltage reducer can be connected to the accessory battery to prevent the accessory battery from receiving an incompatible voltage. Then, so long as the engine is running, the battery pack will be recharging always ready to supply electric power to the electric motor regardless of whether a motorist is driving in the city or on the open highway.

Although the present invention has been described with reference to preferred embodiments, workers skilled in the art will recognize that changes may be made in form and detail without departing from the spirit and scope of the invention.

What is claimed is:

1. A vehicle comprising:
    an electric motor drivably connected to at least one ground engaging drive wheel, the electric motor selectively having a function of rotating the drive wheel;
    a battery being electrically connected to the electric motor, the battery selectively powering the electric motor, the battery selectively being charged by the electric motor;
    a liquid fueled engine drivably connected to at least one ground engaging drive wheel, the liquid fueled engine selectively having a function of rotating the drive wheel;
    an accessory battery electrically connected to vehicle accessories;
    a recharger recharging the accessory battery and the battery, and the recharger receiving power from the liquid fueled engine;
    a voltage controller altering the voltage output of the recharger; and
    a switch changing the output of the recharger between the accessory battery and the battery, the switch directing the altered voltage away from the accessory battery and to the battery when the recharger has substantially charged the accessory battery.

2. The vehicle of claim 1 wherein the liquid fueled engine is selectively coupled to the electric motor.

3. The vehicle of claim 1, wherein the liquid fueled engine is mechanically coupled to the electric motor to operate the electric motor as a mechanical coupling transmitting mechanical power from the liquid fueled engine to the drive wheel.

4. The vehicle of claim 1 wherein the liquid fueled engine and the electric motor simultaneously provide mechanical power to a drive wheel.

5. The vehicle of claim 1 the recharger has a voltage output range between approximately 10 volts and approximately 150 volts.

6. The vehicle of claim 1, wherein the voltage controller is a process controller.

7. The vehicle of claim 1 wherein the liquid fueled engine is selectively coupled to the electric motor.

8. The vehicle of claim 1 wherein the revolutions per minute of the liquid fueled engine match the revolutions per minute of the electric motor.

9. The vehicle of claim 1 wherein the recharger comprises the electric motor.

10. The vehicle of claim 9 wherein the electric motor is the recharger during deceleration of the vehicle.

11. The vehicle of claim 1 further comprising a power splitter dividing power output of the liquid fueled engine between the recharger and at least one drive wheel.

12. The vehicle of claim 1 and further comprising a clutch connecting the liquid fueled engine to the electric motor.

13. A vehicle comprising:
    an electric motor drivably connected to at least one ground engaging drive wheel;
    an electrical store electrically connected to the electric motor;
    a liquid powered engine being connected to a drive wheel and generating electrical power;
    an accessory electrical store providing power to vehicle accessories;
    a recharger selectively recharging the accessory electrical store and the electrical store with a voltage output, and the recharger receiving power from the liquid powered engine;
    a voltage controller altering the voltage output of the recharger, the voltage controller providing a higher voltage output to the electrical store and a lower voltage output to the accessory electrical store; and
    a switch changing the voltage output of the recharger between the accessory electrical store and the electrical store, the switch directing a portion of the voltage output away from the accessory electrical store and to the electrical store when the accessory electrical store has been substantially charged.

14. The vehicle of claim 13, wherein the recharger has a voltage output range of approximately 10 volts to approximately 150 volts.

15. The vehicle of claim 13, wherein the liquid fueled engine is mechanically coupled to the electric motor to operate the electric motor as a mechanical coupling transmitting mechanical power from the liquid fueled engine to a drive wheel.

16. The vehicle of claim 13 wherein the liquid fueled engine and the electric motor simultaneously provide mechanical power to a drive wheel.

17. The vehicle of claim 13, wherein the voltage controller is a process controller.

18. The vehicle of claim 13 wherein the revolutions per minute of the liquid fueled engine match the revolutions per minute of the electric motor.

19. The vehicle of claim 13 wherein the recharger comprises the electric motor.

20. The vehicle of claim 19 wherein the electric motor is the recharger during deceleration of the vehicle.

21. The vehicle of claim 13 further comprising a power splitter dividing power output of the liquid fueled engine between the recharger and at least one drive wheel.

22. The vehicle of claim 13 further comprising a clutch connecting the liquid fueled engine to the electric motor.

23. An electric hybrid vehicle comprising:
 a) an internal combustion engine mechanically coupled to at least one drive wheel;
 b) a first motor/generator mechanically coupled to said internal combustion engine and to said at least one drive wheel;
 c) a relatively high voltage battery pack electrically coupled to said first motor/generator for providing power to said first motor/generator and for receiving generated power from said first motor/generator;
 d) a second motor/generator mechanically coupled continuously to and actuated by said engine, said second motor/generator electrically coupled to said battery pack for charging said battery pack when said first motor/generator drives said drive wheel, said engine drives said drive wheel, or both said engine and said first motor/generator drive said drive wheel;
 e) an accessory battery electrically coupled to said second motor/generator for providing an accessory voltage to accessory devices on said electric hybrid vehicle; and
 f) a power supply electrically coupled between said battery pack and said accessory battery for converting voltage from said high voltage level of said battery pack to said accessory voltage compatible with said accessory battery.

24. The electric hybrid vehicle of claim 23 wherein said second motor/generator is an alternator having a voltage potential output in excess of said high voltage of said battery pack.

25. The electric hybrid vehicle of claim 23 wherein said mechanical coupling between said internal combustion engine and said first motor/generator enables said first motor/generator to assist said internal combustion engine when extra drive power is required, and enables the internal combustion engine to supply motive force to said first motor/generator for generating electrical charging energy to said battery pack when extra drive power is not required.

26. The electric hybrid vehicle of claim 23 wherein said mechanical coupling of said internal combustion engine provides for splitting of power from said internal combustion engine between said at least one drive wheel and said first and second motor/generators.

27. The electric hybrid vehicle of claim 23 further comprising: a process controller for establishing substantially matching rotation speeds between said internal combustion engine and said first motor/generator to thereby maintain smooth operations therebetween.

28. The electric hybrid vehicle of claim 27 wherein said process controller further monitors a state of charge of said battery pack and determines the amount of charge necessary to maintain a charged state of said battery pack.

29. The electric hybrid vehicle of claim 28 wherein said process controller further controls the operation of said first motor/generator to be a motor or to be a generator based on the driving demands of said vehicle and according to said state of charge of said battery pack.

30. The electric hybrid vehicle of claim 23 wherein the power supply is electrically coupled between the second motor/generator and the accessory battery.

31. An electric hybrid vehicle comprising:
 a) an internal combustion engine mechanically coupled to at least one drive wheel;
 b) a first motor/generator mechanically coupled to said internal combustion engine and to said at least one drive wheel;
 c) a relatively high voltage battery pack electrically coupled to said first motor/generator for providing power to said first motor/generator and for receiving generated power from said first motor/generator.
 d) a second motor/generator mechanically coupled continuously to and actuated by said engine, said second motor/generator electrically coupled to said battery pack for charging said battery pack when, said first motor/generator drives said drive wheel, said engine drives said drive wheel, or both said engine and said first motor/generator drive said drive wheel;
 e) an accessory battery electrically coupled to said second motor/generator and said battery pack for providing accessory voltage to accessory devices on said electric hybrid vehicle; and
 f) a power supply electrically coupled between said battery pack and said accessory battery for converting said high voltage of said battery pack to said accessory voltage compatible with said accessory battery.

32. The electric hybrid vehicle of claim 31 wherein said second motor/generator has a voltage potential output in excess of said high voltage of said battery pack.

33. The electric hybrid vehicle of claim 31 wherein said mechanical coupling between said internal combustion engine and said first motor/generator enables said first motor/generator to assist said internal combustion engine when extra drive power is required, and enables the internal combustion engine to supply motive force to said first motor/generator for generating electrical charging energy to said battery pack when extra drive power is not required.

34. The electric hybrid vehicle of claim 31 wherein said mechanical coupling of said internal combustion engine provides for splitting of power from said internal combustion engine between said at least one drive wheel and said first and second motor/generators.

35. The electric hybrid vehicle of claim 31 further comprising: a process controller for establishing substantially matching rotation speeds between said internal combustion engine and said first motor/generator to thereby maintain smooth operations therebetween.

36. The electric hybrid vehicle of claim 35 wherein said process controller further monitors a state of charge of said battery pack and determines the amount of charge necessary to maintain a charged state of said battery pack.

37. The electric hybrid vehicle of claim 36 wherein said process controller further controls the operation of said first motor/generator to be a motor or to be a generator based on the driving demands of said vehicle and according to said state of charge of said battery pack.

* * * * *

UNITED STATES PATENT AND TRADEMARK OFFICE
CERTIFICATE OF CORRECTION

PATENT NO. : 6,481,516 B1
DATED : November 19, 2002
INVENTOR(S) : Bruce F. Field It is certified that error appears in the above-identified patent and that said Letters Patent is hereby corrected as shown below:

<u>Title page</u>,
Item [75], Inventors, delete "Spencer E. Adler, Washington, DC (US)"

<u>Column 8</u>,
Line 20, after "claim 1" add -- wherein --.

Signed and Sealed this

Twenty-seventh Day of April, 2004

JON W. DUDAS
*Acting Director of the United States Patent and Trademark Office*